United States Patent
Gimeno Ferrer

(10) Patent No.: US 12,552,207 B2
(45) Date of Patent: Feb. 17, 2026

(54) METHOD AND APPARATUS FOR INFLATION OF A VEHICLE TIRE

(71) Applicant: FORD GLOBAL TECHNOLOGIES, LLC, Dearborn, MI (US)

(72) Inventor: Daniel Gimeno Ferrer, Valencia (ES)

(73) Assignee: Ford Global Technologies, LLC, Dearborn, MI (US)

( * ) Notice: Subject to any disclaimer, the term of this patent is extended or adjusted under 35 U.S.C. 154(b) by 1299 days.

(21) Appl. No.: 17/101,674

(22) Filed: Nov. 23, 2020

(65) Prior Publication Data

US 2021/0155060 A1 May 27, 2021

(30) Foreign Application Priority Data

Nov. 25, 2019 (GB) ..................... 1917117

(51) Int. Cl.
*B60C 23/04* (2006.01)
*B60S 5/04* (2006.01)

(52) U.S. Cl.
CPC ...... *B60C 23/0484* (2013.01); *B60C 23/0479* (2013.01); *B60S 5/046* (2013.01)

(58) Field of Classification Search
CPC . B60S 5/046; B60C 23/0484; B60C 23/0479; F04F 5/48; F04F 5/50
See application file for complete search history.

(56) References Cited

U.S. PATENT DOCUMENTS

| | | |
|---|---|---|
| 6,252,498 B1 | 6/2001 | Pashayan, Jr. |
| 6,505,507 B1 | 1/2003 | Imao et al. |
| 2002/0030592 A1 | 3/2002 | Hakanen et al. |
| 2004/0016492 A1 | 1/2004 | Moore |
| 2011/0202229 A1* | 8/2011 | Owens ............... B60C 23/0406 701/31.4 |
| 2012/0232753 A1 | 9/2012 | Lhuillier et al. |
| 2012/0271723 A1 | 10/2012 | Penilla et al. |
| 2016/0229233 A1 | 8/2016 | Edwards et al. |
| 2016/0303924 A1 | 10/2016 | Mazor |
| 2018/0108252 A1 | 4/2018 | Pividori |

(Continued)

FOREIGN PATENT DOCUMENTS

| | | |
|---|---|---|
| CN | 109591776 A | 4/2019 |
| DE | 102010060787 A1 | 5/2012 |
| DE | 102017005367 A1 | 12/2018 |

(Continued)

OTHER PUBLICATIONS

Examination Report GB 1917117.2 Filed Apr. 6, 2020, 8 pages.

*Primary Examiner* — Daphne M Barry
(74) *Attorney, Agent, or Firm* — Joseph Zane; Brooks Kushman P.C.

(57) ABSTRACT

A method of inflating a tire of a vehicle includes connecting the vehicle to an external air pump, using a connection, to provide communication of information between the vehicle and the external air pump. The method also includes transmitting information from the vehicle to the external air pump over the connection and controlling the external air pump based upon the communicated information to provide air to a vehicle tire, connected to the air pump, until the communicated information indicates that the tire has reached a desired pressure level, at which point the air pump ceases provision of air to the vehicle tire.

12 Claims, 2 Drawing Sheets

(56) References Cited

U.S. PATENT DOCUMENTS

2018/0215043 A1   8/2018   Michalakis

FOREIGN PATENT DOCUMENTS

| EP | 3434539 A1 | 1/2019 |
| IN | 201921000818 A | 1/2019 |
| IN | 201821049322 A | 2/2019 |
| IN | 201921009935 A | 3/2019 |

* cited by examiner

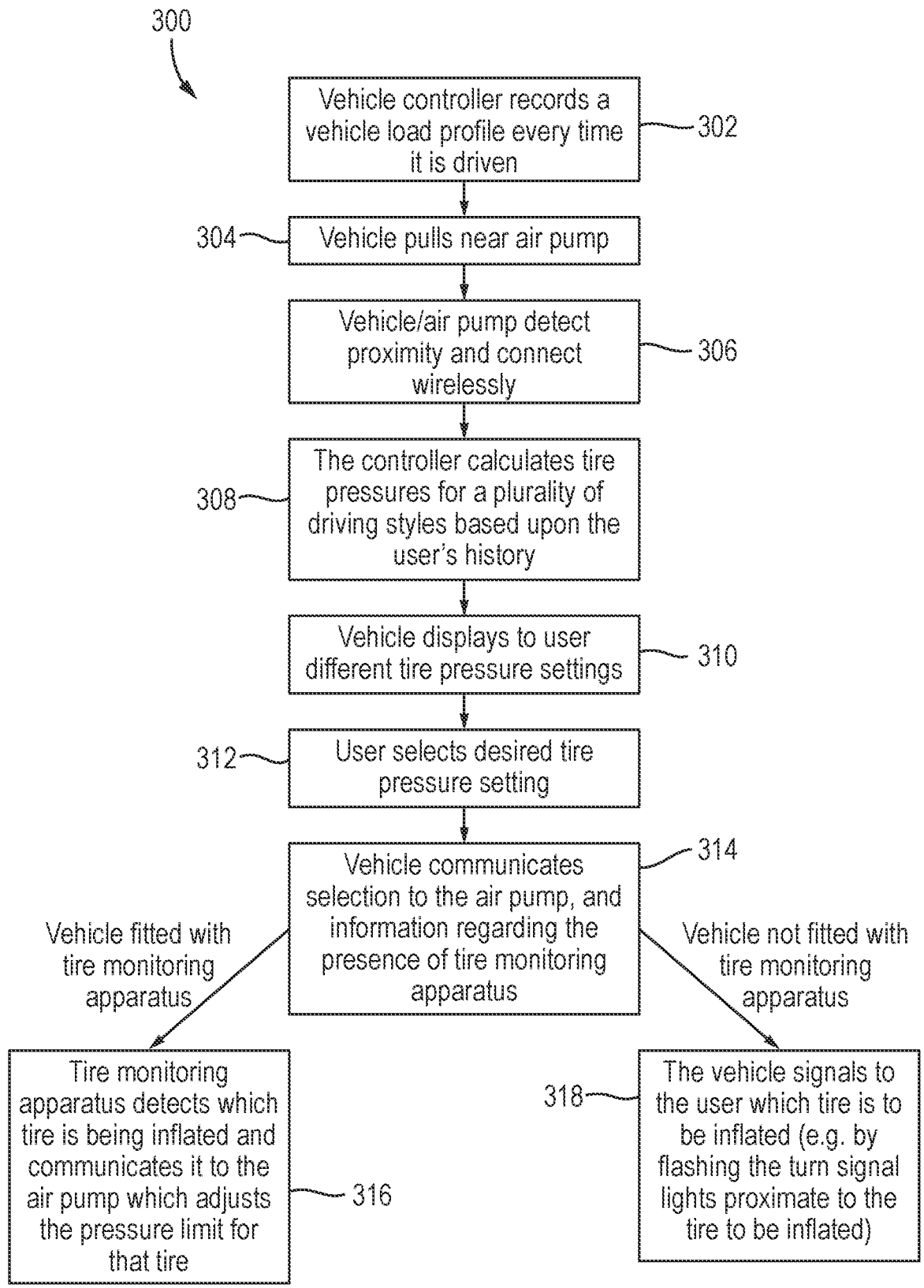

METHOD AND APPARATUS FOR INFLATION OF A VEHICLE TIRE

CROSS-REFERENCE TO RELATED APPLICATIONS

This application claims foreign priority benefits under 35 U.S.C. § 119(a)-(d) to GB Application 1 917 117.2 filed Nov. 25, 2019, which is hereby incorporated by reference in its entirety.

TECHNICAL FIELD

The present disclosure relates to inflation of a tire of a vehicle, such as a motor vehicle (e.g. car, van, truck, motorcycle etc.), industrial or agricultural vehicles (e.g. tractor, forklift, bulldozer, excavator etc.), marine vessel, aircraft or any other type of vehicle. The present disclosure also relates to such a vehicle and an air pump.

BACKGROUND

Typically, when a vehicle tire requires filling up, a user must drive to a filling station where an air pump is provided. The user must look up the required pressure for the tire, which is typically provided in the owner's manual or on a sticker somewhere in the vehicle. The information is usually provided for a range of different types of tires and load cases (such as number of occupants and luggage). The user must select the correct pressure for the tire, before plugging the air pump into the tire and inflating the tire until it reaches the desired pressure. This process may be time-consuming and confusing on the part of the user.

It may therefore be desirable to provide an improved arrangement.

SUMMARY

In a first illustrative embodiment, a method of inflating a tire of a vehicle includes connecting the vehicle to an external air pump, using a connection, to provide communication of information between the vehicle and the external air pump. The method also includes transmitting information from the vehicle to the external air pump over the connection and controlling the external air pump based upon the communicated information to provide air to a vehicle tire, connected to the air pump, until the communicated information indicates that the tire has reached a desired pressure level, at which point the air pump ceases provision of air to the vehicle tire.

In a second illustrative embodiment, a system includes a vehicle processor configured to determine that a vehicle is within a predefined distance from an air pump based on wireless information received from the air pump and responsive to the vehicle being within the predefined distance, establish a wireless connection between a vehicle transceiver and an air pump transceiver.

In a third illustrative embodiment, a non-transitory computer-readable storage medium stores instructions that, when executed by a vehicle processor, cause the processor to perform a method including determining that a vehicle has established a communication connection with an air pump. The method also includes determining a tire to be inflated by the air pump and communicating, over the communication connection, the current tire pressure of the tire and a desired tire pressure of the tire.

Embodiments will now be described by way of example only, with reference to the Figures, in which:

BRIEF DESCRIPTION OF THE DRAWINGS

FIG. 3 schematically shows an exemplary method of inflating a tire of a vehicle.

DETAILED DESCRIPTION

Figure 1:
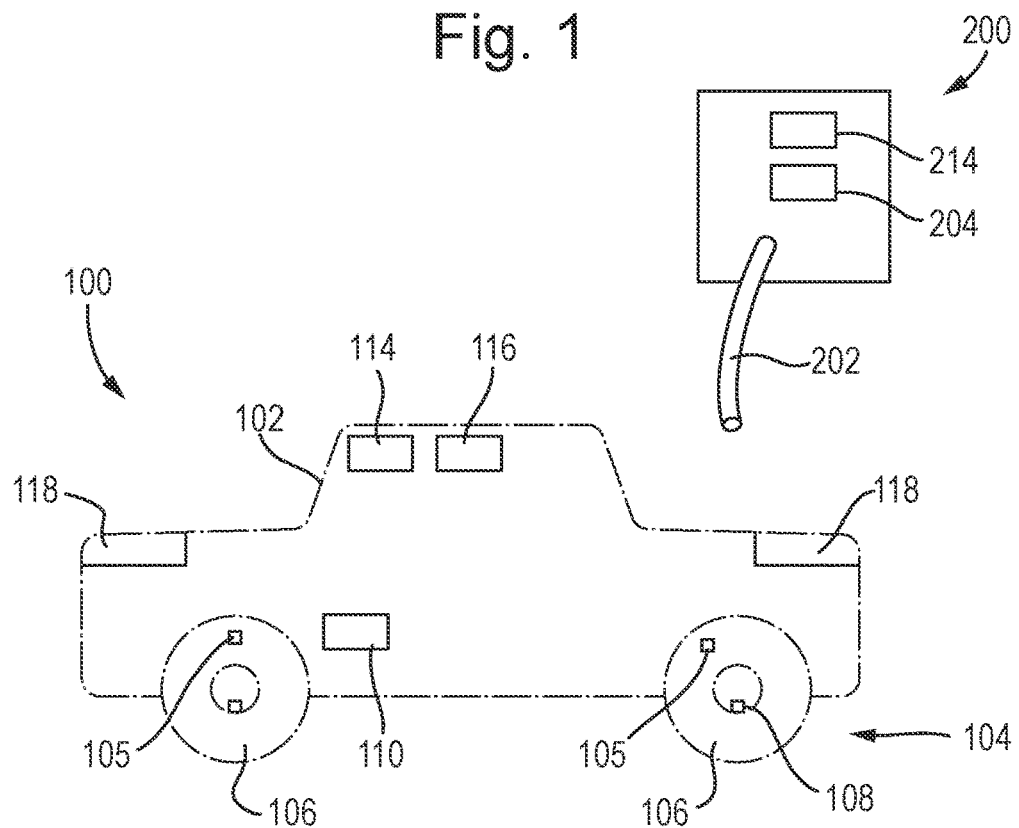
FIG. 1 schematically shows an exemplary vehicle and an exemplary air pump according to the present invention.

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

According to a first aspect there is provided a method of inflating a tire of a vehicle, that includes connecting the vehicle to an external air pump so as to provide communication of information between the vehicle and the external air pump. The method also includes transmitting information from the vehicle to the external air pump and inflating the tire with the external air pump based upon the communicated information.

It will be understood by the skilled person that depending upon various factors, such as the type of use or loading of the vehicle, it may be reasonable to increase or decrease the pressure of a tire based upon the communicated information. Therefore, the term "inflating", although usually referring to increasing the pressure of a tire, may be understood in the context of this application to cover either increasing or decreasing the pressure of the tire.

An external air pump may be an air pump that is not configured to be a part of a vehicle, such as, for example, an air pump located at a filling station. The external air pump may be a handheld pump or a pump not located at a filling station. The communication of information between the vehicle and the external air pump may be communication of information such as selected tire pressures, and/or whether the vehicle is fitted with tire pressure monitoring apparatus. The information may be communicated by a wired or wireless connection. The communication may be two-way communication between the vehicle and the external air pump such that information can be sent from the vehicle to the air pump and vice versa. The communication may be provided in a single direction from the vehicle to the external air pump. The tire may be inflated automatically or manually by a user. Inflating the tire with the external air pump may comprise inflating the tire until a selected tire pressure is reached, at which point the air pump may stop inflation of the tire. By providing communication between the vehicle and the air pump, the method may provide a more user-friendly method of inflating a tire of a vehicle. Further, the method may provide a more precise and efficient method of inflating a tire of a vehicle, for example by removing the need for a user to enter the desired pressure, or to operate the pump manually.

The communication between the vehicle and the air pump may be wireless communication. The wireless communication may be provided between a transmitter and a receiver. The wireless communication may be a BLUETOOTH connection or a Wi-Fi connection or any other form of wireless communication as will be appreciated by the skilled person. Wireless communication removes the need for a user to physically connect the vehicle to the air pump, thereby simplifying the inflating of the tire for the user, although wired communication can be used where desired.

The method may further include detecting the proximity of the vehicle to the external air pump and automatically connecting the vehicle to the external air pump when the vehicle is within a predefined distance from the external air pump. The proximity detection system may comprise a proximity sensor. The proximity detection system may comprise a satellite navigation based system in which the proximity is detected based upon the coordinates of the position of the air pump and vehicle. These coordinates may be detected by GPS, GLONASS or by any other suitable satellite navigation system The proximity of the vehicle to the external air pump may be detected by a proximity detection system on the air pump. Alternatively, the proximity of the external air pump to the vehicle may be detected by a proximity detection system on the vehicle, or an application loaded onto a mobile device such as a phone or watch. By providing automatic detection of the proximity of the vehicle to the air pump and automatic connection, the user does not need to initiate the connection between the vehicle and the air pump, and so the method of inflating a tire of a vehicle may be simplified, although user-initiation of communication is also possible and may serve in instances where multiple vehicles are proximate to the pump.

The information communicated to the external air pump may comprise a desired pressure, optionally based upon user-selected pressure settings and/or recommended pressure settings. The information communicated to the external air pump may comprise information regarding the presence of tire pressure monitoring apparatus in or on the vehicle. The information communicated to the external air pump may comprise the type of tire(s) on the vehicle. The tire pressure monitoring apparatus may be configured to measure the tire pressure of one or more tires. The tire pressure monitoring apparatus may be configured to detect when a tire is being inflated by the air pump.

The vehicle may indicate an order in which the tires should be inflated, optionally by illuminating a turn signal light. The vehicle may indicate an order or sequence in which the tires should be inflated if the vehicle communicates to the external air pump that the vehicle does not have a tire pressure monitoring apparatus. The vehicle may indicate an order by illuminating the turn signal light proximate to the first tire to be inflated, followed by illuminating the turn signal light proximate to the second tire to be inflated, and so on. The next tire to be inflated may be indicated after completing inflation of a previous tire, or the order may be indicated before the inflation of the first tire. Completing inflation of a tire may be considered as the inflation of a tire to a selected or recommended pressure. In this way, if different tires have different selected or recommended pressures, the correct pressure for each tire can be achieved, even without a tire pressure monitoring apparatus fitted to the vehicle.

The vehicle may include a tire pressure monitoring apparatus for measuring the current pressure of a tire. The tire pressure monitoring apparatus may measure the current pressure of one or more tires of the vehicle. The tire pressure monitoring apparatus may comprise a tire pressure monitor fitted to a tire which may provide pressure information to a controller. Each tire may be fitted with a separate tire pressure monitor, each monitor configured to provide pressure information to the controller.

The information communicated to the external air pump may include a current pressure of a tire measured by the tire pressure monitoring apparatus.

The external air pump may inflate the tire from the current pressure to the desired pressure.

The tire pressure monitoring apparatus may detect which tire of the vehicle is being inflated. In this way, if the different tires have different selected or recommended pressures, the correct pressure for each tire can be achieved.

The method may further include displaying to a user a plurality of pressure settings and optionally selecting a preferred setting from the plurality of pressure settings. The plurality of pressure settings to be displayed to the user may include settings calculated by the vehicle. The plurality of pressure settings may be based upon the number of occupants, amount of luggage, season (e.g. summer/winter), all-rounder, recommended via vehicle history, the intended use of the vehicle, etc. The plurality of pressure settings may comprise settings for maximum fuel economy, maximum comfort and/or maximum sportiness etc.

A controller of the vehicle may calculate a recommended tire pressure based upon a measured load history, optionally based upon seatbelt sensors, a suspension sensor, on-board scales and/or a fuel level sensor. The vehicle may record a weight load profile every time it is driven. The seatbelt sensors may be used to detect the number of passengers. The suspension sensor may be used to calculate the weight of the vehicle and its load, which may be based upon a height of the vehicle from the ground. The on-board scales may be load cell scales and may be used to determine the loaded weight of a vehicle, for example a construction vehicle. The fuel level sensor may be used to calculate the weight of fuel in the tank. The vehicle may include a driver identification system. The recommended tire pressure may be based upon the measured load history for that driver.

According to a second aspect there is provided a vehicle configured for connection with an external air pump so as to provide communication of information between the vehicle and the external air pump. An external air pump may be an air pump that is not configured to be a part of a vehicle, such as, for example, an air pump located at a filling station. The communication of information between the vehicle and the external air pump may be communication of information such as selected tire pressures, and/or whether the vehicle is fitted with tire pressure monitoring apparatus. The information may be communicated by a wired or wireless connection. The communication may be two-way communication between the vehicle and the external air pump such that information can be sent from the vehicle to the air pump and vice versa. The communication may be provided in a single direction from the vehicle to the external air pump.

The vehicle may include a physical connector for connection to the external air pump for wired communication. The vehicle may include a plug or socket and/or a cable for connection to the external air pump.

The vehicle may include a transmitter and/or a receiver for wireless connection to the external air pump.

The tire may be inflated automatically or manually by a user. Inflating the tire with the external air pump may include inflating the tire until a selected tire pressure is reached, at which point the air pump may stop inflation of the tire. By providing communication between the vehicle and the air pump, the vehicle may provide a more user-friendly means of inflating a tire of a vehicle. Further, the vehicle may provide a more precise and efficient means of inflating a tire of a vehicle, for example by removing the need for a user to enter the desired pressure, or to operate the pump.

The vehicle may be configured for wireless connection with the external air pump. The wireless communication may be provided between a transmitter and a receiver. The wireless communication may be a Bluetooth connection or a Wi-Fi connection or any other form of wireless communication as will be appreciated by the skilled person. Wireless communication removes the need for a user to physically connect the vehicle to the air pump, thereby simplifying the inflating of the tire for the user.

The vehicle may include a tire pressure monitoring apparatus. The tire pressure monitoring apparatus may be configured to measure the pressure of one or more tires of the vehicle. The tire pressure monitoring apparatus may comprise a tire pressure monitor fitted to a tire which may provide pressure information to a controller. Each tire may be fitted with a separate tire pressure monitor, each configured to provide pressure information to the controller.

A controller of the vehicle may be configured to calculate a recommended tire pressure based upon a measured load history, optionally based upon seatbelt sensors, a suspension sensor, on-board scales and/or a fuel level sensor. The vehicle may record a weight load profile every time it is driven. The vehicle may comprise seatbelt sensors which may be used to detect the number of passengers. The vehicle may comprise a suspension sensor which may be used to detect the weight of the vehicle and its load, which may be based upon a height of the vehicle from the ground. The on-board scales may be load cell scales and may be used to determine the loaded weight of a vehicle, for example a construction vehicle. The vehicle may comprise a fuel level sensor which may be used to calculate the weight of fuel in the tank. The vehicle may comprise a driver identification system. The recommended tire pressure may be based upon the measured load history for that driver.

According to a third aspect there is provided an air pump for inflating a tire of a vehicle configured for connection with a vehicle so as to provide communication of information between the air pump and the vehicle. The air pump may be an external air pump that is not configured to be a part of a vehicle, such as, for example, an air pump configured to be located at a filling station. The communication of information between the vehicle and the air pump may be communication of information such as selected tire pressures, and/or whether the vehicle is fitted with tire pressure monitoring apparatus. The information may be communicated by a wired or wireless connection. The communication may be two-way communication between the vehicle and the air pump such that information can be sent from the vehicle to the air pump and vice versa. The communication may be provided in a single direction from the vehicle to the air pump.

The air pump may comprise a physical connector for connection to the vehicle for wired communication. The air pump may comprise a plug or socket and/or a cable for connection to the vehicle.

The air pump may comprise a transmitter and/or a receiver for wireless connection to the vehicle.

The tire may be inflated automatically or manually by a user. Inflating the tire with the air pump may comprise inflating the tire until a selected tire pressure is reached, at which point the air pump may stop inflation of the tire. By providing communication between the vehicle and the air pump, the air pump may provide a more user-friendly means of inflating a tire of a vehicle. Further, the vehicle may provide a more precise and efficient means of inflating a tire of a vehicle, for example by removing the need for a user to enter the desired pressure, or to operate the pump.

The air pump may be configured for wireless communication with the vehicle. The wireless communication may be provided between a transmitter and a receiver. The wireless communication may be a Bluetooth connection or a Wi-Fi connection or any other form of wireless communication as will be appreciated by the skilled person. Wireless communication removes the need for a user to physically connect the vehicle to the air pump, thereby simplifying the inflating of the tire for the user.

The air pump may be configured to detect the proximity of the vehicle to the air pump, wherein the air pump is configured to automatically connect to the vehicle when the vehicle is within a predefined distance from the air pump. The air pump may comprise a proximity detection system configured to detect the proximity of the vehicle. By providing automatic detection of the proximity of the vehicle to the air pump and automatic connection, the user does not need to initiate the connection between the vehicle and the air pump, and so the air pump may provide a more user-friendly and efficient air pump.

According to a fourth aspect, there is provided an apparatus comprising an air pump according to the third aspect and a vehicle according to the second aspect.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

FIG. 1 shows an illustrative vehicle 100 and an illustrative tire air pump 200. In the example shown, the vehicle is a car 100, but it should be understood that the principles of this disclosure are equally applicable to other motor vehicles (e.g. car, van, truck, motorcycle etc.), industrial or agricultural vehicles (e.g. tractor, forklift, bulldozer, excavator etc.), marine vessel, aircraft or any other type of vehicle.

The vehicle 100 includes a vehicle body 102 and a plurality of wheels 104 (only two shown). Each wheel 104 includes a tire 106 which is configured to be filled with air, via a valve 108. The vehicle 100 further includes a tire monitoring apparatus 110, which is connected to pressure sensors 105 on each tire 106, so as to measure the pressure of each of the tires 106.

The vehicle 100 further includes a wireless transmitter/receiver 114 which is configured to connect with a complementary wireless transmitter/receiver 214 of the air pump 200. In this example the wireless connection is a Bluetooth connection and the transmitters/receivers 114, 214 are Bluetooth receivers. It will be appreciated by the skilled person that alternative types of wireless transmitters/receivers 114, 214 may be used, or that a wired connection may be used instead.

The vehicle 100 also includes a controller 116 which receives data from a plurality of sensors (not shown), and a driver identification system. In this example, the sensors are: seatbelt sensors, a suspension sensor and a fuel level sensor, however it will be appreciated that in other examples, only one or two of these sensors may be used, or many other different types of sensors may be used. An alternative embodiment includes on-board scales instead of, or in addition to the suspension sensor. The seatbelt sensors detect the use of seatbelts within the vehicle and accordingly calculate the number of people in the vehicle. The suspension sensor can calculate the weight of the vehicle and its load based on a measured height of the vehicle off the ground. The fuel level sensor detects the volume of fuel remaining in the tank and can calculate the mass of the remaining fuel. The driver identification system identifies the driver of the vehicle.

The controller 116 includes a memory in which it stores a load history of the vehicle 100, in particular a load history of the vehicle 100 when associated with the identified driver.

The controller 116 uses the load history from the sensors to determine a plurality of recommended tire pressures for each of the tires 106, corresponding to different driving styles, for instance maximum fuel economy, maximum comfort and maximum sportiness. The controller 116 presents the options to the user on a screen in the vehicle 100 or on the air pump 200, such that the user may select their preferred settings. In alternative embodiments, the controller 116 may communicate with a mobile device such as a phone or watch and display the options on the mobile device, through which the user may select their preferred settings.

In other examples, it will be appreciated that the controller 116 may select the recommended tire pressures without input from the user, or that the controller may select a favorite or previously selected setting for that driver, based upon information from the driver identification system. The controller 116 is arranged to communicate the selected setting to the air pump 200 via the wireless transmitter/receiver 114.

The vehicle further includes indicator lights 118 on each corner of the vehicle 100, configured to be illuminated by the user when intending to turn left or right. In some examples, for instance when a vehicle 100 does not have a tire monitoring apparatus 110, the indicator lights 118 are configured to illuminate to indicate an order in which the tires are to be filled, based upon a signal from the controller 116. This ensures that, when different tires require different pressures, each tire 106 is filled with the correct pressure of air with minimal input from the user.

Also shown in FIG. 1 is an air pump 200 according to an example. The air pump 200 includes an air hose 202 configured for attachment to a valve 108 of a tire 106, and configured to deliver air to the tire 106.

The air pump 200 includes a proximity detection system 204 configured to detect the presence of a vehicle 100. The proximity detection system 204 may be of any type considered suitable by the skilled person. In one embodiment, the proximity detection system 204 is a proximity sensor. In an alternative embodiment, the proximity detection system 204 is a satellite navigation based system in which the proximity of the air pump 200 and vehicle 100 is determined based upon the coordinates of the position of the air pump 200 and the vehicle 100, such as GPS coordinates. It will be appreciated that, in alternative embodiments, instead of being a feature of the air pump 200, the proximity detection system 204 may be a feature of the vehicle 100, or an application loaded onto a mobile device such as a phone or watch, etc.

Figure 2:
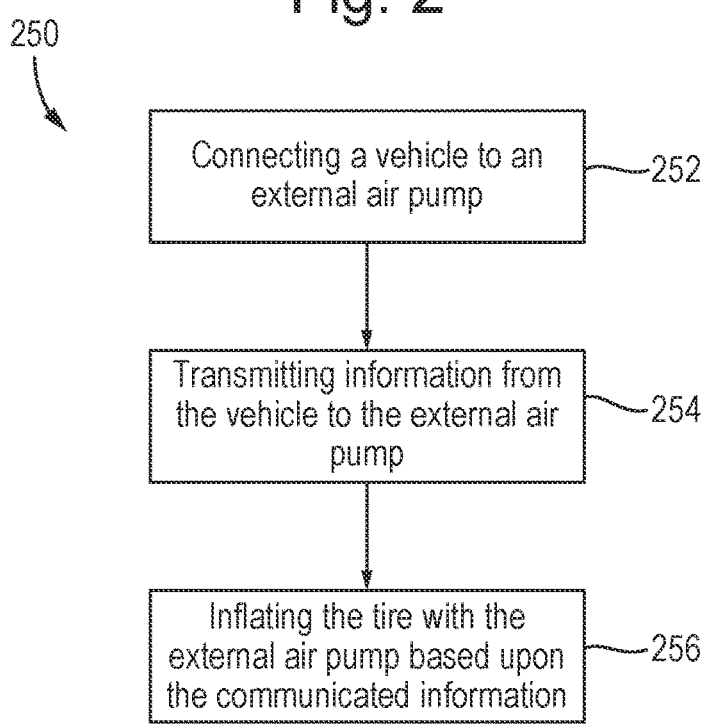
FIG. 2 schematically shows an exemplary basic method of inflating a tire of a vehicle.

Referring now to FIG. 2, a method 250 of inflating a tire of a vehicle according to an example is shown.

In its most basic form, the method 250 includes a step 252 of connecting a vehicle 100 to an external air pump 200, followed by a step 254 of transmitting information from the vehicle 100 to the external air pump. In a third step 256, a tire 106 of the vehicle 100 is inflated with the external air pump 200, based upon the communicated information.

In a preferred embodiment of the invention, a method 300 is provided, as shown in FIG. 3.

Step 302 includes the recording of a vehicle load profile over a period of time by the controller 116 in conjunction with the vehicle sensors (seatbelt sensors, a suspension sensor and a fuel level sensor). As described above, the controller 116 is able to identify a specific driver using the driver identification system and record a specific load history for each user. The period of time in this example is the entire history of the vehicle, however in other examples, the history could be stored for a defined period of minutes, hours, days or weeks, depending on the memory of the controller 116, a user's data plan allowance, or a user's privacy settings, etc.

In step 304, the vehicle 100 is driven up to the air pump 200. As the vehicle 100 approaches the air pump 200, the proximity detection system 204 of the air pump detects the presence of the vehicle 100 and initiates a wireless connection (step 306) between the transmitter/receiver 214 of the air pump 200 and the transmitter/receiver 114 of the vehicle 100. Once established, the wireless connection allows communication of data between the vehicle 100 and the air pump 200.

In step 308, the controller 116 calculates a recommended tire pressure for each tire of the vehicle, for a plurality of different driving styles, based upon the load history from the sensors. The recommended tire pressures are based upon the load history of a particular driver, such as their most commonly used load. The different driving styles in this example are maximum fuel economy, maximum comfort and maximum sportiness, but other options will be appreciated by the skilled person. The skilled person will also appreciate that step 308 may be performed by the controller continuously before connection of the vehicle 100 and the air pump 200.

The vehicle 100 then displays (step 310) the recommended tire pressures for each of the different driving styles on a screen of the vehicle 100. In this example, the options are displayed in the vehicle 100, but it will be appreciated that in other examples, the options may be communicated to the air pump 200 or to a mobile device via the wireless connection and displayed on the air pump 200 or mobile device.

The user than selects their preferred option (step 312), which is communicated to the air pump 200 (step 314). As discussed above, in other examples, the controller 116 may automatically select a particular setting based on a user's selection history, for example if they have selected a "favorite" driving style. It will be understood that in this case, steps 310 and 312 will be skipped.

Also in step 314, the vehicle 100 communicates information regarding the presence of the tire monitoring apparatus 110. In this example, the vehicle 100 includes a tire monitoring apparatus 110 which measures the pressure of each tire 106 and accordingly is able to detect when a particular tire 106 is being inflated, and this information is communicated to the air pump 200. When the user connects the air hose 202 of the air pump 200 to the valve 108 of the tire 106 and the air pump begins to inflate the tire 106, the tire monitoring apparatus 110 detects (step 316) which tire 106 of the vehicle is being inflated. This information, along with the selected tire pressure for that tire is communicated to the air pump 200, which adjusts the pressure limit for that tire accordingly, to ensure the air pump 200 stops when the desired pressure is reached. After filling of the first tire 106, the user moves the air hose 202 to the next tire to be inflated and the process is repeated until each of the desired tires has been inflated.

In other examples, the vehicle 100 may not include a tire monitoring apparatus 110. In this case (step 318), the controller 116 illuminates a first indicator light 118 which is proximate to the first tire 106 to be inflated (such as a front left indicator for a front left tire). The controller 116 also communicates the selected pressure for the first tire 106 to the air pump 200. The user connects the air hose 202 of the air pump 200 to the valve 108 of the tire 106 and the air pump begins to inflate the tire 106 until the desired pressure is reached. In this example, the pressure of the tire 106 is measured by a conventional pressure monitor 105 provided on the air pump 200. After inflation of the first tire 106, the second tire 106 to be inflated is indicated, again by illumination of a proximate indicator light 118, and the process is repeated until each of the desired tires 106 has been inflated.

As will be appreciated by the skilled person, the method, vehicle, air pump and apparatus according to the illustrative embodiments, and the like, may provide a simpler and more user-friendly way of inflating the tires of a vehicle. Further, the illustrative embodiments, and the like, may provide a more precise and efficient way of inflating a tire of a vehicle, for example by removing the need for a user to enter a desired pressure or to operate the pump.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly illustrated or described.

What is claimed is:

1. A method of inflating a tire of a vehicle, the method comprising:
    connecting the vehicle to an external air pump, using a wireless connection, to provide communication of information between the vehicle and the external air pump, including detecting a proximity of the vehicle to the external air pump, and automatically connecting the vehicle to the external air pump using the wireless connection when the vehicle is within a predefined distance from the external air pump as indicated by the detected proximity;
    transmitting information from the vehicle to the external air pump over the connection; and
    controlling the external air pump based upon the communicated information to provide air to a vehicle tire, connected to the air pump, until the communicated information indicates that the tire has reached a desired pressure level, at which point the air pump ceases provision of air to the vehicle tire.

2. The method of claim 1, wherein the desired pressure is based on at least one of user-selected pressure settings or recommended pressure settings defined in a memory of the vehicle.

3. The method of claim 1, wherein the vehicle indicates an order in which the tires should be inflated by illuminating a turn signal light corresponding to a given tire based on location of the light and the given tire.

4. The method of claim 1, wherein the vehicle comprises a tire pressure monitoring apparatus for measuring a current pressure of the vehicle tire.

5. The method of claim 4, wherein the information transmitted to the external air pump comprises the current pressure of the vehicle tire measured by the tire pressure monitoring apparatus.

6. The method of claim 4, wherein the tire pressure monitoring apparatus detects which tire of the vehicle is being inflated.

7. The method of claim 1, further comprising:
    displaying to a user a plurality of pressure settings for the vehicle tire, on a display of the vehicle; and
    receiving selection of a preferred setting from the plurality of pressure settings.

8. The method of claim 1, wherein a controller of the vehicle calculates a recommended tire pressure for the vehicle tire based on a measured load history and at least one of seatbelt sensors, a suspension sensor, on-board scales, or a fuel level sensor.

9. A system comprising:
    a vehicle processor configured to:
    determine that a vehicle is within a predefined distance from an air pump based on wireless information received from the air pump; and
    responsive to the vehicle being within the predefined distance, establish a wireless connection between a vehicle transceiver and an air pump transceiver.

10. The system of claim 9, wherein the processor is further configured to
    determine a recommended tire pressure based on a measured load history and at least one of seatbelt sensors, suspension sensors, on-board scales or fuel level sensors; and
    transmit the recommended tire pressure to the air pump over the wireless connection.

11. The system of claim 10, wherein the system includes a tire pressure monitoring system configured to determine the pressure of a tire with which the tire pressure monitoring system is associated, and wherein the processor is further configured to transmit a current tire pressure, as measured by the tire pressure monitoring system, to the air pump over the wireless connection.

12. The system of claim 10, wherein the processor is configured to indicate which tire should be filled by activating a vehicle light associated with a given vehicle tire.

* * * * *